United States Patent [19]
Ota

[11] Patent Number: 5,107,365
[45] Date of Patent: Apr. 21, 1992

[54] LASER SCANNER DEVICE
[75] Inventor: Kazuo Ota, Hiratsuka, Japan
[73] Assignee: Kabushiki Kaisha Komatsu Seisakusho, Tokyo, Japan
[21] Appl. No.: 477,838
[22] PCT Filed: Aug. 29, 1989
[86] PCT No.: PCT/JP89/00880
  § 371 Date: Apr. 6, 1990
  § 102(e) Date: Apr. 6, 1990
[87] PCT Pub. No.: WO90/02354
  PCT Pub. Date: Mar. 8, 1990
[30] Foreign Application Priority Data
  Aug. 30, 1988 [JP] Japan ................... 63-216140
[51] Int. Cl.[5] .............................. G02B 26/08
[52] U.S. Cl. ................... 359/213; 359/221; 359/223
[58] Field of Search ............. 350/6.6, 6.9, 6.91, 350/6.1, 632, 486, 487; 73/517 R, 517 A, 514; 324/109; 356/138

[56] References Cited
U.S. PATENT DOCUMENTS 4,660,941  4/1987  Hattori et al. ............... 359/224
4,708,420  11/1987 Liddiard ...................... 359/213
4,778,233  10/1988 Christenson et al. ......... 359/213

FOREIGN PATENT DOCUMENTS 49-103019  9/1974  Japan .
49-131143  12/1974 Japan .
50-7546    1/1975  Japan .
53-143910  12/1978 Japan .
61-1114    1/1986  Japan .
61-52208   4/1986  Japan .
62-7879    2/1987  Japan .

Primary Examiner—Loha Ben
Attorney, Agent, or Firm—Richards, Medlock & Andrews

[57] ABSTRACT

A piezoelectric actuator capable of producing a linear displacement is used for the control of deflection angle of a scanning deflection mirror. To convert the linear displacement produced by the piezoelectric actuator into rotational displacement, a lever contacting the piezoelectric actuator is attached to the rotary shaft of the mirror and is urged by a spring in the direction counter to the direction of rotation caused by the piezoelectric actuator. An amplifying mechanism amplifies a small displacement produced by the piezoelectric actuator into a large rotational displacement proportional to the linear displacement produced by the piezoelectric actuator, thereby imparting a desired deflection angle to the deflection mirror. A mechanism for detecting rotational displacement is associated with the input or the output shaft of the amplifying mechanism to feedback any positional offset. When the detection mechanism is associated with the output shaft, the rotational displacement is converted again into a linear displacement through a pinion-and-rack mechanism and the amount of linear displacement of the rack is sensed by a non-contact type linear sensor as an amount which corresponds to the amount of rotational displacement.

7 Claims, 7 Drawing Sheets

LASER SCANNER DEVICE

TECHNICAL FIELD OF THE INVENTION

The present invention relates to a rotary laser scanner device which is used in, for example, a laser processing apparatus and which is capable of deflecting, through rotation of a deflection mirror, an incident laser beam so as to position the laser beam. More particularly, the present invention is concerned with a rotary laser scanner device having improved driving and detection mechanisms for the rotation of the deflection mirror.

BACKGROUND OF THE INVENTION

Laser beams are finding wide use in various fields such as optical office equipments and video devices, besides fields such as laser markers, laser trimmers and so forth. When a laser beam is used, it is necessary to properly position the laser beam, i.e., to effect deflection and scanning of laser beam. To this end, hitherto, laser scanner devices of galvanometer-type have been used popularly.

A galvanometer-type laser scanner device has, as shown in Japanese Patent Unexamined Publication No. 53-143910 for example, a mirror attached to the rotor shaft of an electric motor having a stator and a rotor capable of performing a limited rotation. The scanner device also has a position sensor of electrostatic capacitance type arranged around the rotor shaft of the motor, and output from this sensor is fed back to the instruction signal given to the motor, thereby to position the mirror.

This known laser scanner device, however, has suffered from the following disadvantages:

(1) A positional drift of 600 $\mu$rad/°C. or so is caused by a change in the ambient temperature.

(2) Response speed is low because the drive relies upon magnetic force. In particular, response speed is low at start-up of the motor (start-up time 3 to 4 msec).

Some of the known laser scanner devices of the type described above employ, as the rotation angle sensor for positioning the mirror, a low-inertia type device in which an electrostatic capacitance type sensor b is arranged to surround the rotation shaft a of the mirror. This type of rotation angle sensor is superior in that the rotation angle is sensed with a high resolution of 0.005° or so, but undesirably exhibits a large temperature drift of 0.03°/°C. or so. FIG. 2 shows another known rotation angle sensor for positioning the mirror, in which a light-emitting element d and a light-receiving element e are arranged spaced apart from the mirror rotation shaft c, so that the angular displacement of the shaft c is sensed by the light-receiving element e. This type of rotation angle sensor also exhibits high resolution and low inertia, but suffers from impractically narrow sensing coverage and inferior linearity.

SUMMARY OF THE INVENTION

Accordingly, an object of the present invention is to provide a laser scanner device which can operate with a high response speed, particularly at start-up, and which can always maintain a constant high level of mirror positioning accuracy regardless of change in ambient air temperature.

Another object of the present invention is to provide a laser scanner device which can improve the linearity of sensing output representing the sensed rotation angle of the output shaft.

To this end, according to the present invention, there is provided a laser scanner device for deflecting a laser beam by a deflection mirror which is rotated at high speed, comprising: a piezoelectric actuator capable of producing a linear displacement corresponding to an input drive signal; a motion converting member for converting the linear displacement produced by the piezoelectric actuator into a rotational displacement; a displacement amplifying mechanism having an output shaft to which the rotation shaft of the deflection mirror is coupled, the displacement amplifying mechanism being capable of amplifying the rotational displacement output from the motion converting member; and control means for inputting a drive signal, for rotatingly driving the deflection mirror, to the piezoelectric actuator.

Thus, according to the invention, a piezoelectric actuator having improved response characteristic is used in place of magnetic actuator which is used conventionally, and linear displacement produced by the piezoelectric actuator is converted into a rotary displacement through a motion converting member, thereby effecting deflection of the mirror. The piezoelectric actuator may be of the type which is formed by laminating thin plates of a piezoelectric material such as lead zircon-titanate. Such a piezoelectric actuator produces, upon receipt of a control voltage corresponding to the control rotation amount of the mirror, a linear displacement corresponding to the control amount. The motion converting member may be a lever member connected to the mirror rotation shaft or to a shaft which is drivingly connected to the mirror rotation shaft. In such a case, the piezoelectric actuator is held in contact with one end of the lever such that a linear motion produced by the piezoelectric actuator produces a forward rotation of the rotary shaft, while an elastic member is held in contact with the other end of the lever so as to urge the lever in the direction which produces backward rotation of the mirror rotation shaft. This enables the piezoelectric actuator to be continuously held in contact with the lever without any play, so that the amount of rotation of the rotary shaft is controlled in direct proportion to the amount of linear motion produced by the piezoelectric actuator. Furthermore, since the amount of linear displacement of the piezoelectric actuator is comparatively small, the laser scanner device of the invention incorporates a displacement amplifying mechanism for amplifying the output motion of the piezoelectric actuator. The displacement amplifying mechanism may be of the type which has a first shaft carrying an oval cam and a ball bearing secured to the outer periphery of the cam, a second shaft made of a flexible material and contacted at its inner peripheral surface with the ball bearing of the first shaft and provided with teeth on the outer surface thereof, and a third shaft made of a rigid material provided on the inner peripheral surface thereof with teeth meshing with the teeth of the second shaft, the number of the teeth of the third shaft being different from the number of teeth of the second shaft. This displacement amplifying mechanism is constructed such that the second shaft and the first shaft are used as an input shaft and an output shaft, respectively, while the third shaft is fixed. With such an arrangement, it is possible to obtain a large amplification factor of 100 or so, by virtue of the differential effect of the mechanism. It is thus possible to properly drive the deflection mirror with a small displacement produced by the piezoelectric actuator.

In the laser scanner device described above, the rotational displacement of the shaft is sensed by measuring the amount of rotation of the lever secured to the rotary shaft. Thus, the means for sensing the amount of rotation of the shaft may be of the type which includes a bracket secured to the lever member for rotation as a unit therewith, and a non-contact type distance sensor which is stationed ahead of the bracket as viewed in the direction of rotation. The sensor may be a non-contact type linear sensor of eddy-current type which is capable of sensing the rotational displacement as a change in the impedance of a sensor coil proportional to a change in the distance between the bracket and the sensor. This type of rotation sensing means may be associated with the input shaft which is rotationally driven by the piezoelectric actuator. Alternatively, this may be associated with the first shaft of the displacement amplifying mechanism which serves as an output shaft to which the deflection mirror is attached. In such a case, the arrangement may be such that a pinion-rack mechanism is formed by a pinion attached to the output shaft and a meshing rack so that the rotational displacement of the mirror is sensed through sensing linear displacement of the rack. A non-contact type linear sensor also may be used as means for sensing the linear displacement of the rack: namely, a sensor having a sensor coil the impedance of which is changed in accordance with the change in the distance between the rack and the sensor body.

The rotational displacement of the mirror, sensed by one of the means described above, is fed back to the output of command means which generates a command signal for rotationally driving the deflection mirror. Namely, the offset of the detected rotation amount from the command amount is inputted as a correction signal to the piezoelectric actuator, whereby a mirror deflection control is executed with a high degree of accuracy.

According to the described arrangement, a minute linear displacement produced by the piezoelectric actuator is converted by the motion converting member into rotational displacement, and the rotational displacement is amplified by the displacement amplifying mechanism so that the deflection mirror is rotated by an amount corresponding to the amplified rotation amount. The rotation amount of the deflection mirror is momentarily corrected through feedback of the rotation amount from the rotation amount sensing mechanism. It is thus possible to obtain a laser scanner device which can operate with a high degree of accuracy.

According to the invention, the linear displacement produced by the piezoelectric actuator is converted into a rotational displacement and then amplified to drive the deflection mirror, so that a high response speed with good start-up characteristic is obtained and the positioning accuracy is always maintained constant regardless of the temperature, thus offering a high precision of processing by laser. In consequence, the present invention improves productivity of laser processing apparatus while widening application of such apparatus.

DETAILED DESCRIPTION

The invention will be described in more detail with reference to the accompanying drawings showing embodiments of the present invention.

Figure 1:
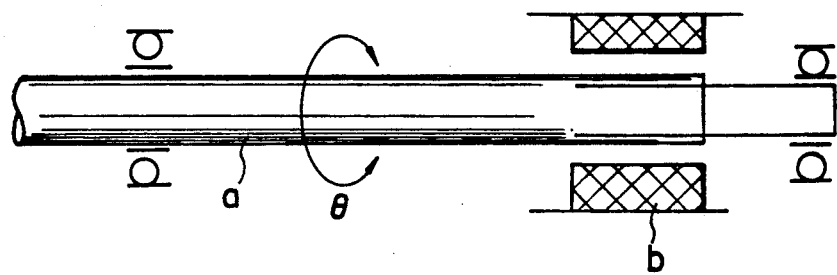
FIG. 1 is a side elevational view of a conventional deflection mirror rotation sensing mechanism used in a laser scanner device.
Figure 2:
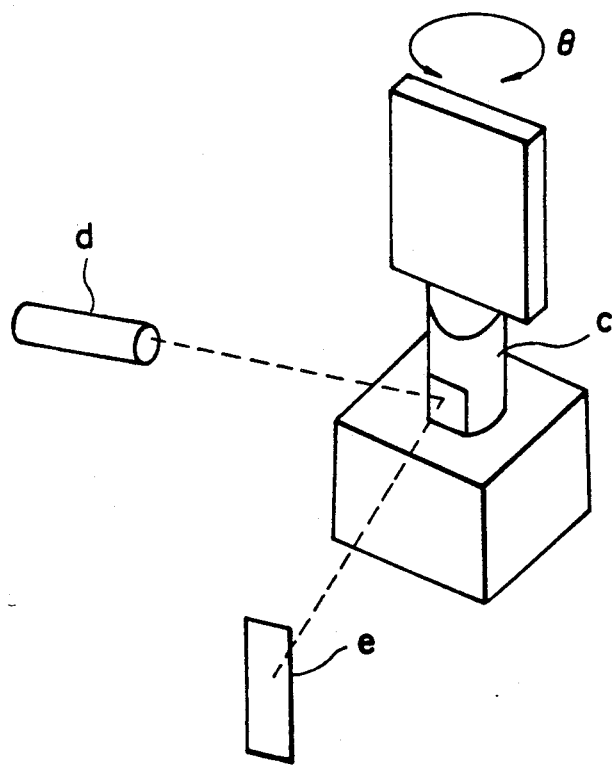
FIG. 2 is a perspective view of another conventional rotation sensing mechanism.
Figure 3:
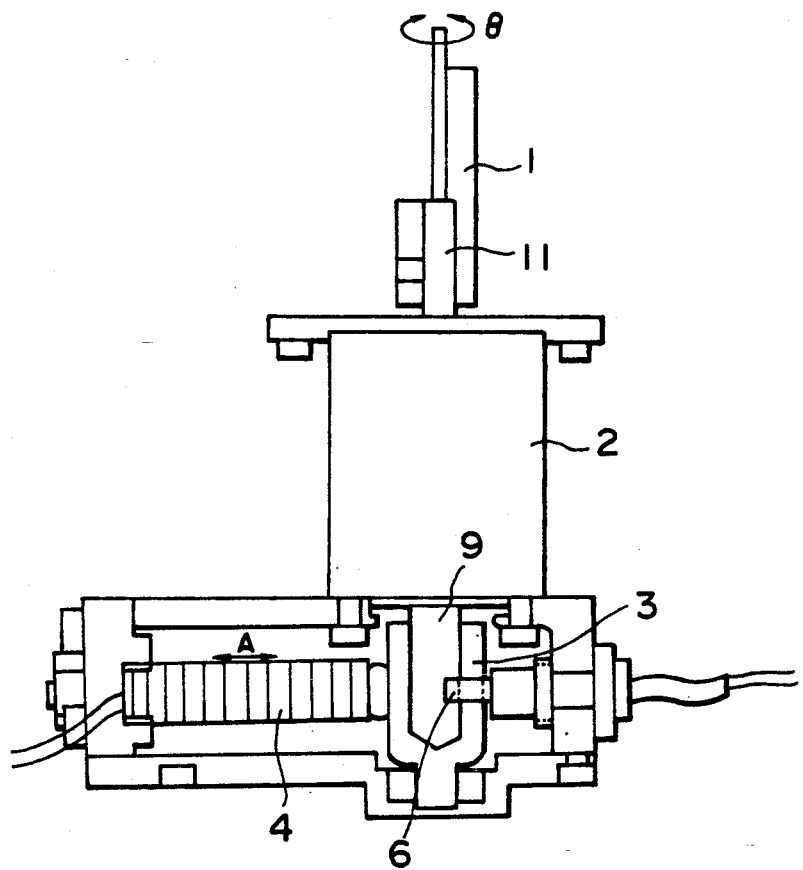
FIG. 3 is a longitudinal sectional view of a mechanical portion of an embodiment of the present invention.
Figure 4:
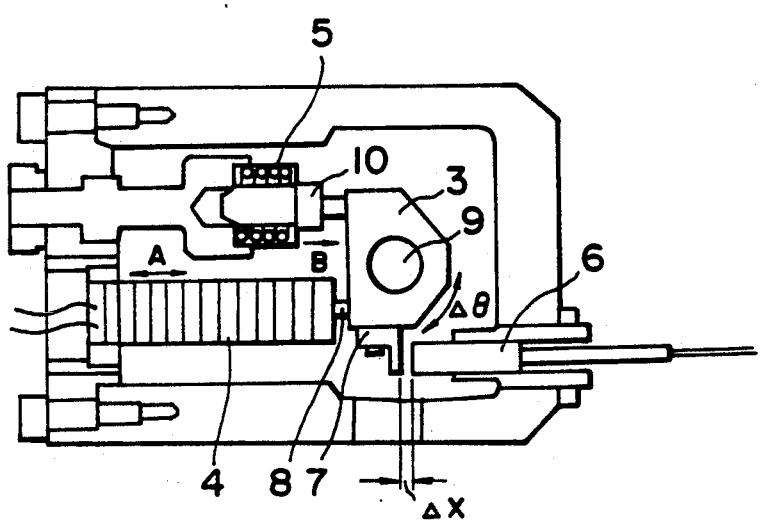
FIG. 4 is a cross-sectional view of the mechanical portion shown in FIG. 3.

FIG. 3 is a longitudinal sectional view of a mechanical portion of an embodiment of the laser scanner device in accordance with the present invention, while FIG. 4 is a cross-sectional view of the mechanical portion.

The scanner device has parts or components such as a mirror 1, a differential over-drive mechanism 2 as a displacement amplifying mechanism, a lever 3, a piezoelectric actuator 4, a reaction spring 5, a position sensor 6, a bracket 7 and so forth.

The piezoelectric actuator 4 is driven and controlled by a later-mentioned control circuit 30 so as to produce a linear displacement (direction of arrow A) in an amount corresponding to the input drive signal. The piezoelectric actuator 4 inherently has large actuating force and high response speed (responsive to frequencies of 1 KHz or higher) as compared with other types of actuators. The piezoelectric actuator 4 contacts a lever 3 through a pin 8.

The lever 3 is fixed to a shaft 9 for rotation together with the shaft 9 about the axis of the shaft 9. An L-shaped bracket 7 is secured to one side of the lever 3. The shaft 9 serves as the input shaft (low-speed shaft) of the differential over-drive mechanism 2 which will be detailed later. The lever 3 also receives, through a piston 10, a force which is produced by the reaction spring 5 and which acts in the direction of the arrow B. Therefore, the lever 3 is urged counter-clockwise by the displacement of the piezoelectric actuator 4 and clockwise by the reaction force produced by the spring 5.

Figure 8:
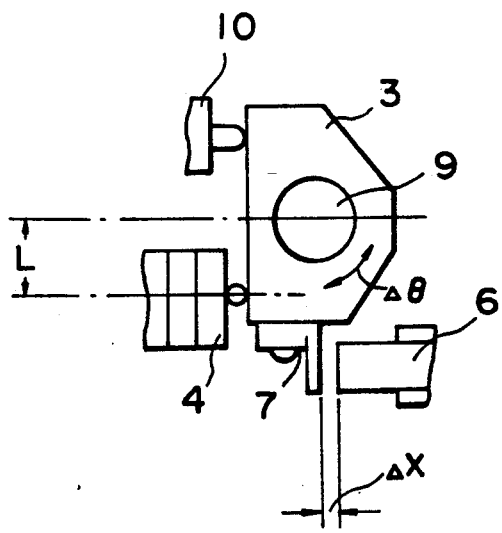
FIG. 8 is an illustration of a linear motion-rotary motion converting system.

The lever 3 serves as a motion converting member which converts a linear displacement $\Delta x$ of the piezoelectric actuator 4 into rotational displacement $\Delta \theta$. Referring to FIG. 8, representing the distance between the center of the shaft 9 and the center of the piezoelectric actuator 4 by L, the rotational displacement $\Delta \theta$ is given as follows:

$$\Delta \theta = \Delta x / L$$

The non-contact type position sensor 6 is capable of sensing the distance $\Delta x$ between itself and the bracket 7 attached to the lever 3 and delivering to a later-mentioned control circuit 30 (see FIG. 7) a signal Vs ($=k_1\Delta x$) corresponding to the sensed distance $\Delta x$.

Figure 5:
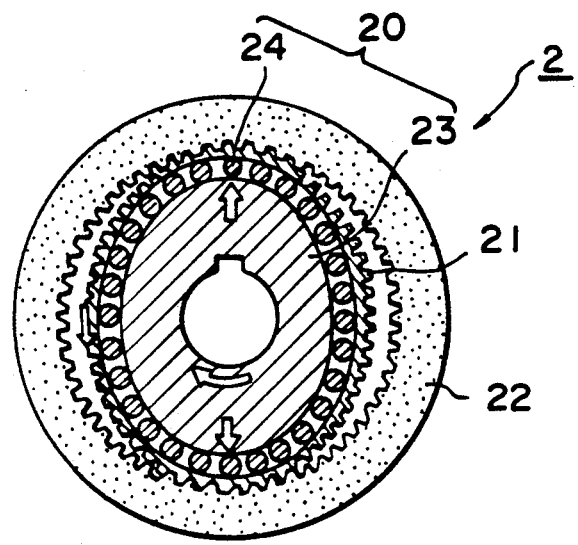
FIG. 5 is a sectional view of a differential over-drive mechanism showing the internal structure thereof.

The differential over-drive mechanism 2 is capable of amplifying small rotational displacement of the lever 3. As shown in FIG. 5, the differential over-drive mechanism 2 has an inner shaft 20, an intermediate spline member 21 and an outer spline member 22. The inner shaft 20 has an oval cam 23 and a ball bearing 24 secured to the outer periphery of the cam 23. The intermediate spline member 21 is a thin-walled cylindrical flexible metallic member having a plurality of teeth (number of teeth being expressed by $Z_1$) on the outer peripheral surface thereof. The outer spline member 22 is a ring-shaped rigid member having a plurality of teeth (number of teeth being represented by $Z_2$) formed on the inner peripheral surface thereof at the same pitch as the teeth on the intermediate spline member 21. The numbers $Z_1$ and $Z_2$ of the teeth of the intermediate spline member 21 and the outer spline member 22 are determined to meet the condition of $Z_2=Z_1+n$. Thus, there is a difference n in the number of teeth on the two spline members.

The principle of operation of the differential over-drive mechanism 2 will be outlined with respect to the case of speed reduction. When the inner shaft 20 is rotated while the outer spline 22 is fixed, the position of meshing teeth of the intermediate spline member 21 and the outer spline member 22 is moved progressively as a result of the flexible deformation of the intermediate spline member 21. Since the number of teeth on the intermediate spline member 21 is smaller than that of the teeth on the outer spline member 22 by n, the intermediate spline member 21 rotates by an angle corresponding to the number n in the counter direction to the rotation of the inner shaft 20 per one full rotation of the inner shaft 20. Thus, a speed reduction at a reduction ratio i expressed by the following formula can be achieved by using the inner shaft 20 and the intermediate spline member 21 as the input and output shafts, respectively, while fixing the outer spline member 22.

$$i=-(Z_2-Z_1)/Z_1=-n/Z_1$$

The differential over-drive gear, when used in over-drive mode, operates in a manner reverse to that described above. Namely, in the over-drive mode, the intermediate spline member 21 and the inner shaft 20 are respectively used as the input shaft and the output shaft, while the outer spline member 22 is fixed, so that an over-drive is achieved at a ratio i which is given by $i=-Z_1/n$.

Figure 6:
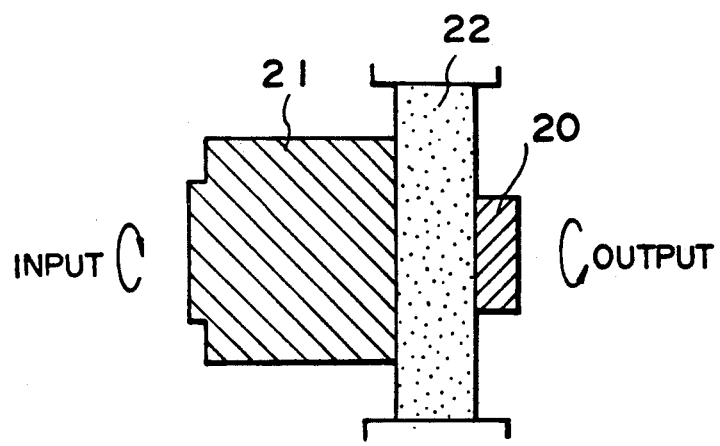
FIG. 6 is an illustration of an example of operation of the differential over-drive mechanism.

The differential over-drive mechanism 2 has the same arrangement as that shown in FIG. 6. More specifically, the intermediate spline member 21 and the inner shaft 20 are respectively coupled to the low-speed input shaft 9 and the high-speed output shaft 11, while the outer spline member 22 is fixed. According to this arrangement, a rotational displacement $\Delta \theta$ of the lever 3 is transmitted to the rotational differential over-drive mechanism 2 through the low-speed input shaft 9 so that the high-speed output shaft 11 rotates by an amplified amount $\theta$ expressed by the following formula, in the direction counter to the rotational displacement $\Delta \theta$:

$$\theta=(\Delta\theta \cdot Z_1/n)$$

With this differential over-drive mechanism 2, it is easy to obtain a large amplification factor of 100 or so.

The deflection mirror 1 is secured to the high-speed output shaft 11 of the differential over-drive mechanism 2, so that a laser beam from a laser source (not shown) is deflected by the mirror 1 rotating at high speed, thereby scanning an object to be processed by the laser beam.

Figure 7:
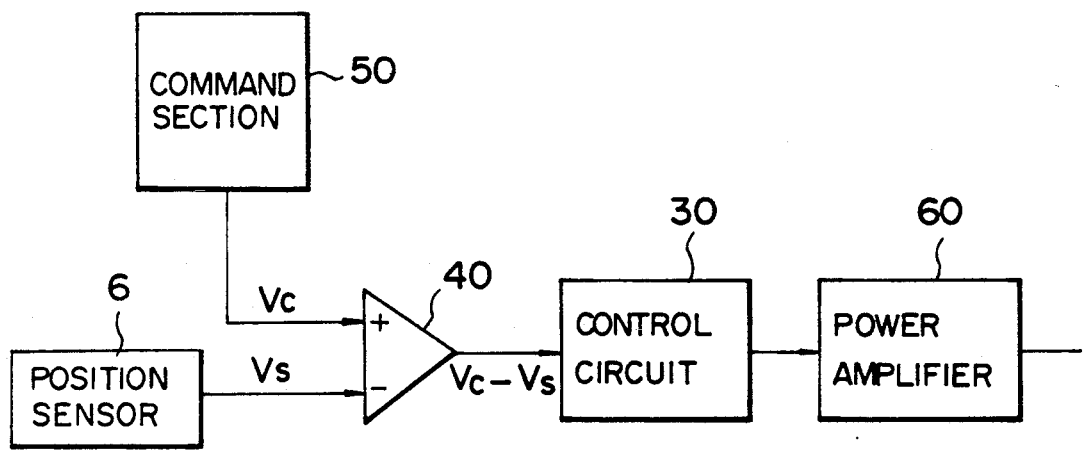
FIG. 7 is a block diagram showing an example of a control system incorporated in the embodiment.

FIG. 7 shows the construction of the control system. The sensing output Vs ($=K_1\Delta x$) of the aforementioned position sensor 6 is input to a comparator 40 which also receives a command signal Vc from a command section 50 for driving the reflection mirror 1. The comparator 40 determines the offset $\Delta V$ ($=Vc-Vs$) of the sensing output from the command and inputs this offset to the control circuit 30. The offset signal $\Delta V$ is delivered from the control circuit 30 to a power amplifier 60, so as to be used as a drive signal for driving the piezoelectric actuator 4. A signal $k_2\Delta V$, obtained through amplification performed by the power amplifier 60, is delivered to the piezoelectric actuator 4.

Figure 9:
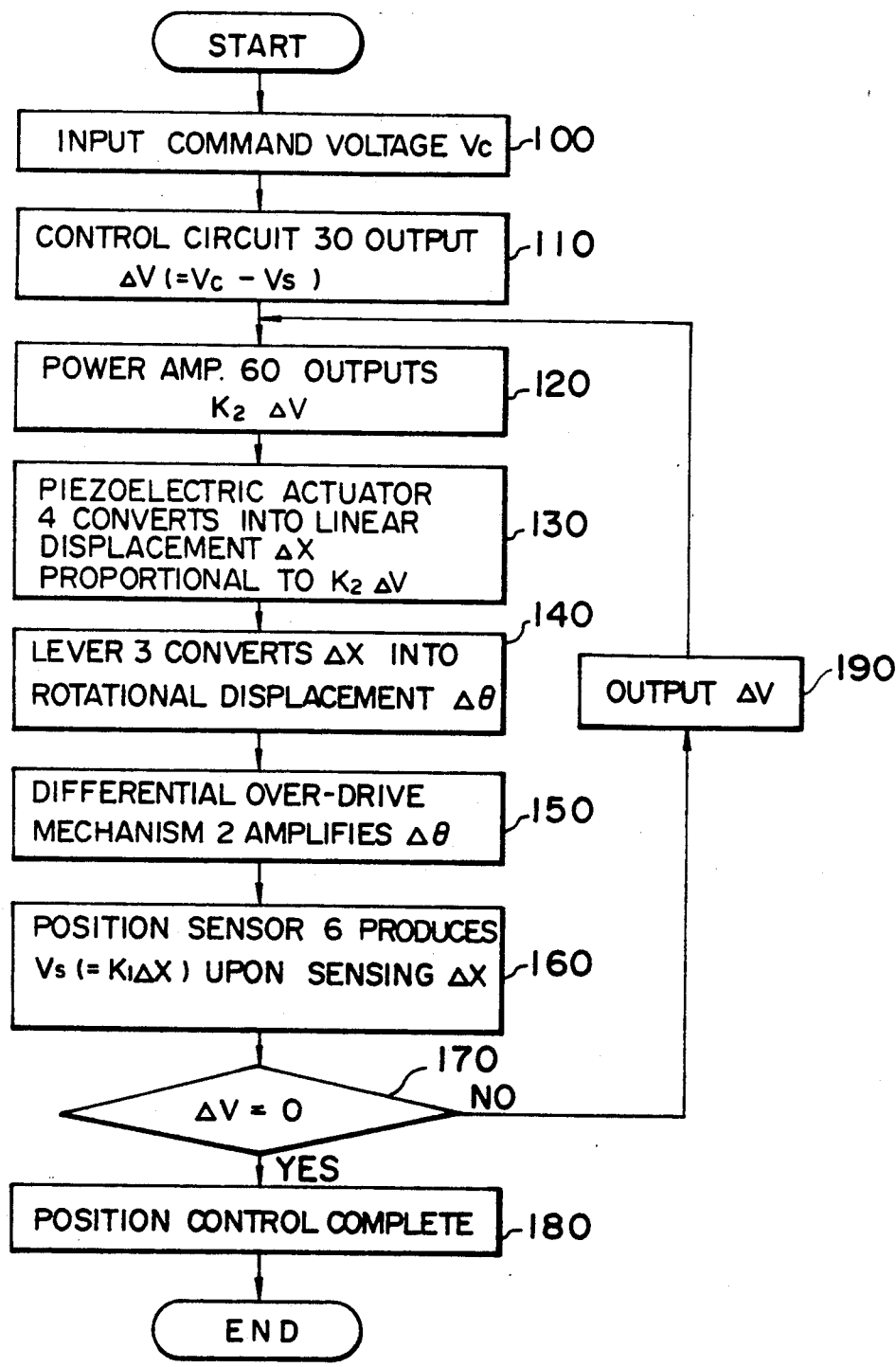
FIG. 9 is a flow chart illustrative of operation of the embodiment.

The operation of this embodiment will be described with reference to the flow chart shown in FIG. 9.

As the laser scanner device starts to operate, a command signal Vc corresponding to the command rotation angle $\theta$ is input to the comparator 40 which determines the offset $\Delta V$ ($=Vc-Vs$) of the sensing output of the position sensor 6 from the command signal Vc. This offset signal is delivered to the power amplifier 60 through the control circuit 30 (Steps 100, 110). The power amplifier 60 amplifies this offset signal $\Delta V$ to produce an amplified output $k_2\Delta V$ which is input to the piezoelectric actuator 4 (Step 120).

Upon receipt of the drive signal $K_2\Delta V$, the piezoelectric actuator 4 produces a linear displacement $\Delta x$ corresponding to the drive signal $K_2\Delta V$ in the direction of the arrow A (Step 130). In response to the linear displacement $\Delta x$, the lever 3 rotates by an angle $\Delta \theta$ ($=\Delta x/L$) (Step 140). The rotational displacement of the lever 3 is then amplified through the rotary differential over-drive mechanism 2 and the deflection mirror 1 is rotated by an amount corresponding to the amplified rotational displacement (Step 150).

Meanwhile, the position sensor 6 measures the distance $\Delta x$ between itself and the bracket 7 secured to the lever 3, and inputs a signal Vs ($=K_1\Delta x$) corresponding to the measured distance $\Delta x$ to the control circuit 30 through the comparator 40 (Step 160). The control circuit 30 determines whether the offset $\Delta V$ between the command signal Vc and the feedback signal Vs has become zero (Step 170) and continues to supply the offset signal $\Delta V$ to the piezoelectric actuator 4 (Step 190) until the offset is reduced to zero. Thus, one cycle of position control is completed when the offset signal $\Delta V$ has become zero (Step 180).

According to this arrangement, the piezoelectric actuator 4 is used as the drive power source in order to attain a high response speed. In consequence, a high response speed responsive to 200 Hz or so at the maximum, as well as a large driving force, can be obtained. In addition, the speed of start-up of mirror rotation can be increased 2 to 3 times as compared with that of conventional devices for a given scan angle.

Furthermore, a large amplification factor, e.g., 100 or so, can be obtained by virtue of the combination of the lever 3 and the differential over-drive mechanism 2 which converts the linear displacement of the piezoelectric actuator to a rotational displacement while magnifying the amount of displacement. Furthermore, the displacement can be sensed without causing any undesirable effect on the dynamic characteristics of the scanner, since the displacement of the shaft is sensed by sensing the displacement of the bracket 7 secured to the lever 3 by the non-contact type position sensor 6. Furthermore, the sensed displacement is fed back to the command signal so that a high-speed position control without any drift is performed with a high degree of reproducibility (±0.02 mm).

The embodiment described hereinbefore can suitably be changed or modified within the scope of the present invention. For instance, the mechanism for obtaining amplified rotational displacement from a linear displacement may be a mechanism which employs a ball screw.

The arrangement shown in FIG. 6 for over-drive mode operation of the differential over-drive mechanism 2 also is illustrative and may be modified such that, for example, the outer spline member 22 and the intermediate spline member 21 are respectively used as the input and output shafts while the inner shaft 20 is fixed.

Figure 10:
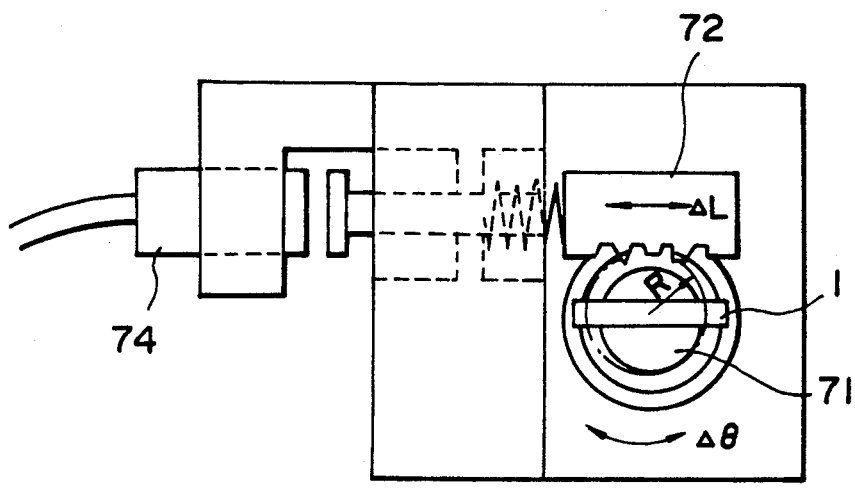
FIG. 10 is a plan view of a mechanism for sensing rotation of a deflection mirror shaft.
Figure 11:
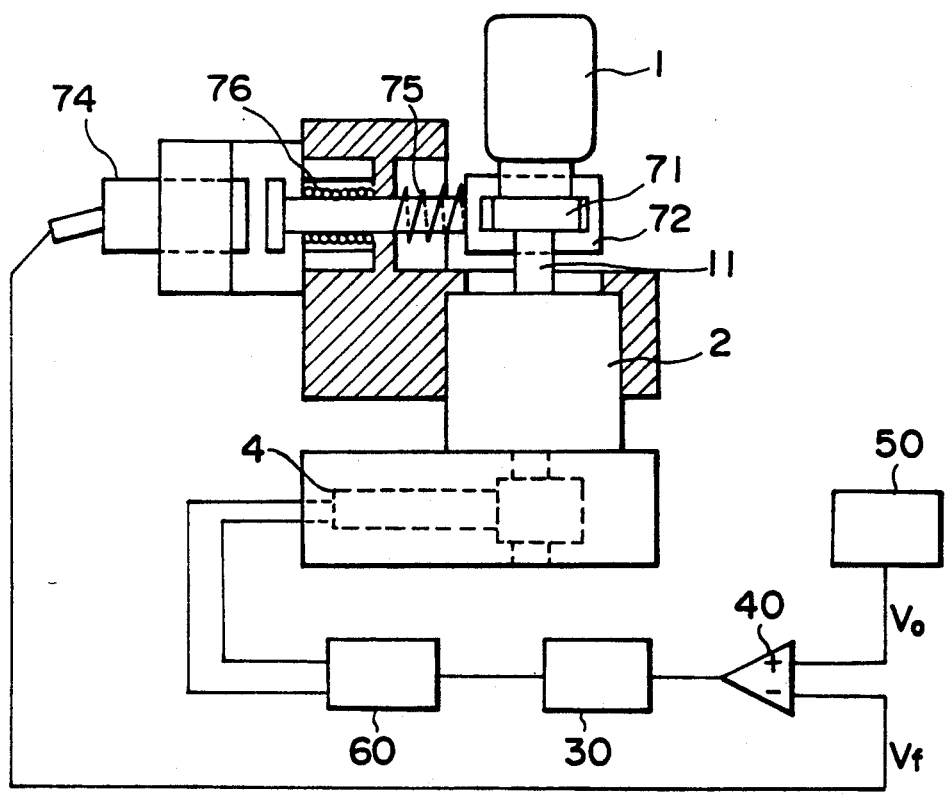
FIG. 11 is a block diagram of the whole laser scanner device incorporating the rotation sensing mechanism.

The described construction of the position sensor for sensing the displacement also can be replaced with suitable other arrangement which is capable of sensing a value corresponding to the rotation angle of the mirror. Another embodiment which employs an alternative arrangement of the position sensor will be described by way of example with reference to FIGS. 10 to 12. FIG. 10 shows in plan the rotation sensing mechanism incorporated in this embodiment, A pinion 71 is fixed to the output shaft 11 to which the mirror 1 is secured. The mechanism also has a rack plunger 72 which makes a linear motion in meshing engagement with the pinion 71. A non-contact type linear sensor 74 is stationed so as to oppose an end of the rack plunger 72. As the mirror 1 rotates, the rack plunger 72 moves linearly so as to change the distance between itself and the linear sensor 74 in proportion to the amount of rotation of the mirror. FIG. 11 shows an arrangement in which the sensing mechanism shown in FIG. 10, which is shown in side elevation, is combined with an input/output circuit.

A pre-loading spring 75 is associated with the rack plunger 72 so as to eliminate any back-lash in the meshing engagement between the pinion 71 and the rack plunger 72, while ensuring proper rotation follow-up characteristic. The rack plunger 72 is carried through ball bearings 76 so that it can slide without substantial resistance. This embodiment also has a differential over-drive mechanism 2, a piezoelectric actuator 4, a command section 50, a comparator 40, a control section 30 and a power amplifier 60. The pinion 71 is coaxially fixed to the output shaft 11 of the mirror 1 and is held in meshing engagement with the rack plunger 72. Therefore, representing the rotation angle of the pinion 71 by $\Delta\theta$ and the pitch circle radius of the pinion 71 by R, the linear displacement $\Delta L$ is given by $\Delta L = R\Delta\theta$. It is therefore possible to detect the rotation angle $\Delta\theta$ by sensing the linear displacement $\Delta L$.

Figure 12:
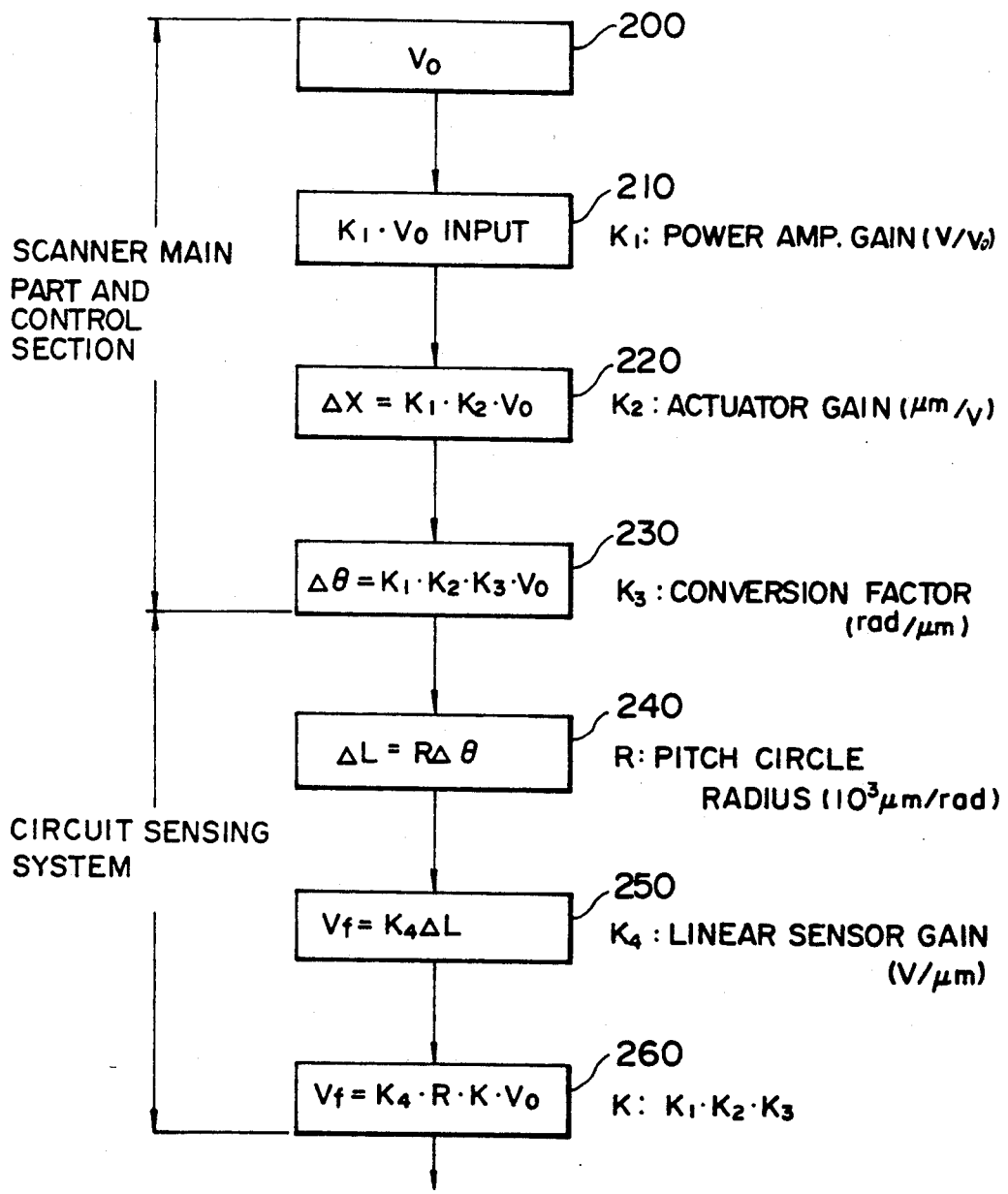
FIG. 12 is a flow chart showing the operation of the rotation sensing mechanism.

Thus, in this rotation sensing mechanism, the linear displacement $\Delta L$ of the rack plunger 72 is sensed by the non-contact type sensor 74. FIG. 12 illustrates the processes (Steps 210-230) for inputting and converting an input, as well as a process of converting signal in the sensing section of the circuit (Steps 240-250), performed when the command voltage input from the command section 50 is set at $V_0$ (Step 200). More specifically, the command voltage $V_0$ is input (Step 200) and a signal $K_1 V_0$ is input from the power amplifier 60 to the piezoelectric actuator 4 (Step 210) so as to take into account the gain $k_1 (= V/V_0)$ of the power amplifier 60. Upon receipt of this input, the piezoelectric actuator 4 generates a displacement $\Delta x$ which is given by $\Delta x = K_1 K_2 V_0$ (Step 220), where $K_2$ represents the gain ($\mu m/V$) of the piezoelectric actuator. In consequence, the output rotation angle $\Delta\theta$ is converted into the amount of rotation of the mirror by a formula $\Delta\theta = K_1 K_2 K_3 V_0$, where $K_3$ is a conversion factor (rad/$\mu$m). In this rotation sensing mechanism, the rotation angle $\Delta\theta$ is converted by the rack plunger 72 into a linear displacement which is determined by $\Delta L = R\Delta\theta$, where R represents the pitch circle radius of the pinion 71. The linear displacement $\Delta L$ is sensed by the non-contact type linear sensor 74 by a formula $V_f = K_4 \Delta L$ (Step 250), where $K_4$ represents the gain (V/$\mu$m). Finally, the output $V_f$ of the linear sensor 74 and the command input $V_0$ are linearized as follows (Step 260):

$$V_f = K_1 \cdot K_2 \cdot K_3 \cdot K_4 \cdot R V_0.$$

As will be understood from the foregoing description, the present invention can effectively be used in deflecting a laser beam in various laser processing apparatus, semiconductor production devices such as laser markers and laser trimmers, as well as optical office equipments and other video devices, and can be applied to various fields in which high response speed of laser beam deflection is required.

What is claimed is:

1. A laser scanner device for deflecting a laser beam by a deflection mirror which is rotated at high speed, comprising:

a piezoelectric actuator capable of producing a linear displacement corresponding to an input drive signal;

a motion converting member for converting the linear displacement produced by said piezoelectric actuator into a rotational displacement;

a displacement amplifying mechanism having an output shaft to which a rotation shaft of said deflection mirror is coupled, said displacement amplifying mechanism being capable of amplifying the rotational displacement output from said motion converting member; and control means for inputting said drive signal, for rotatingly driving said deflection mirror, to said piezoelectric actuator.

2. A laser scanner device according to claim 1, wherein said displacement amplifying mechanism has a differential over-drive mechanism which includes:

a first shaft having an oval cam and a ball bearing mounted on the outer periphery of said cam;

a second shaft made of a flexible material and having an inner peripheral surface contacting said ball bearing on said first shaft and having teeth formed on the outer peripheral surface thereof; and a third shaft made of a rigid material and having teeth formed on the inner peripheral surface thereof and meshing with said teeth on said second shaft, the number of teeth on said third shaft being different from the number of teeth on said second shaft.

3. A laser scanner device according to claim 2, wherein said second and first shafts serve as input and output shafts of said differential over-drive mechanism, while said third shaft is fixed.

4. A laser scanner device according to claim 1, wherein said motion converting member includes a lever which is rotatably supported such that it receives the force output from said piezoelectric actuator acting in the direction for causing a forward rotation of said lever and a force of an elastic member acting in the direction for causing a backward rotation of said lever.

5. A laser scanner device according to claim 1, wherein said control means includes:
- detection means for detecting the rotational displacement of said motion converting member;
- command means for generating a command signal for rotatingly driving said deflection mirror; and
- means for determining the offset of the output of said detection means from the output of said command means.

6. A laser scanner device according to claim 5, wherein said rotational displacement detection means in said control means includes a lever contacted by said piezoelectric actuator and a non-contact type linear sensor disposed ahead of said lever as viewed in the direction of rotation of said lever, said non-contact type linear sensor being capable of sensing the distance between itself and said lever.

7. A laser scanner device according to claim 5, wherein said rotational displacement detection means includes a pinion fixed to the shaft to which said deflection mirror is attached;
- a rack plunger meshing with said pinion and capable of converting the rotation of said pinion into a linear motion; and
- a non-contact type linear sensor capable of sensing the linear displacement of said rack plunger.

* * * * *